United States Patent
Kim et al.

(10) Patent No.: US 9,622,035 B2
(45) Date of Patent: Apr. 11, 2017

(54) RELAY CONTROL METHOD FOR PROXIMITY SERVICE AND DEVICE THEREFOR

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/899,443

(22) PCT Filed: Jul. 4, 2014

(86) PCT No.: PCT/KR2014/006026
§ 371 (c)(1),
(2) Date: Dec. 17, 2015

(87) PCT Pub. No.: WO2015/002508
PCT Pub. Date: Jan. 8, 2015

(65) Prior Publication Data
US 2016/0150373 A1 May 26, 2016

Related U.S. Application Data

(60) Provisional application No. 61/843,044, filed on Jul. 4, 2013, provisional application No. 61/899,277, filed
(Continued)

(51) Int. Cl.
*H04W 4/08* (2009.01)
*H04W 4/02* (2009.01)
(Continued)

(52) U.S. Cl.
CPC ............ *H04W 4/023* (2013.01); *H04B 7/026* (2013.01); *H04W 8/005* (2013.01); *H04W 88/04* (2013.01)

(58) Field of Classification Search
None
See application file for complete search history.

(56) References Cited

U.S. PATENT DOCUMENTS

2006/0009248 A1   1/2006   Sakamoto et al.
2010/0157826 A1   6/2010   Yu et al.
(Continued)

OTHER PUBLICATIONS

3rd Generation Partnership Project, "Technical Specification Group Services and System Aspects; Feasibility Study for Proximity Services (ProSe) (Release 12)," 3GPP TR 22.803, V12.2.0, Jun. 2013, pp. 1-45.
(Continued)

*Primary Examiner* — Quan M Hua
(74) *Attorney, Agent, or Firm* — Birch, Stewart, Kolasch & Birch, LLP (57) ABSTRACT

The present invention relates to a method and a device by which first user equipment (UE) that is located out of the range of a group communication service determines a relay through a proximity service (ProSe) in a wireless communication system. Particularly, the method comprises the steps of: receiving traffic transmitted by second UE which already relays group communication; determining whether the traffic is information bound to group communication; determining relay UE by using a discovery procedure for a relay for the group communication, when the traffic is not recognized as the information bound to the group communication; and determining the second UE as the relay UE for the group communication, when the traffic is recognized as the information bound to the group communication.

10 Claims, 7 Drawing Sheets

Related U.S. Application Data on Nov. 3, 2013, provisional application No. 61/973,863, filed on Apr. 2, 2014.

(51) Int. Cl.
*H04B 7/026* (2017.01)
*H04W 8/00* (2009.01)
*H04W 88/04* (2009.01)

(56) References Cited

U.S. PATENT DOCUMENTS

| | | |
|---|---|---|
| 2011/0134828 A1 | 6/2011 | Osseiran et al. |
| 2014/0092885 A1* | 4/2014 | Venkatachalam ... H04W 76/023 370/338 |
| 2014/0141777 A1* | 5/2014 | Guo ............... H04W 8/005 455/434 |
| 2014/0162644 A1* | 6/2014 | Ou ............... H04W 76/023 455/435.1 |
| 2014/0162688 A1* | 6/2014 | Edge ............... H04W 8/005 455/456.1 |
| 2014/0198708 A1* | 7/2014 | Lee ............... H04W 76/023 370/312 |

OTHER PUBLICATIONS

Renesas Mobile Europe Ltd., "Connection Setup via ProSe UE-to-Network Relay," SA WG2 Meeting #97, S2-131971, Temporary Document, Busan, South Korea, May 27-31, 2013, pp. 1-4.

* cited by examiner

RELAY CONTROL METHOD FOR PROXIMITY SERVICE AND DEVICE THEREFOR

CROSS REFERENCE TO RELATED APPLICATIONS

This application is the National Phase of PCT International Application No. PCT/KR2014/006026, filed on Jul. 4, 2014, which claims priority under 35 U.S.C. 119(e) to U.S. Provisional Application Nos. 61/843,044, Jul. 4, 2013, 61/899,277 filed on Nov. 3, 2013 and 61/973,863 filed Apr. 2, 2014, all of which are hereby expressly incorporated by reference into the present application.

TECHNICAL FIELD

The present invention relates to a wireless communication system, and more particularly, to a relay control method for proximity service and a device therefor.

BACKGROUND ART

A Proximity Service (ProSe) refers to a scheme that supports communication between devices located physically close to each other. Specifically, ProSe is aimed to discover an application operating in devices that are in proximity to each other and ultimately to support an operation of exchanging application-related data. For example, it may be considered that ProSe is applied to applications such as Social Network Services (SNS), commerce, and games.

ProSe may also be called Device-to-Device (D2D) communication. That is, ProSe refers to a communication scheme for establishing a direct link between a plurality of devices (e.g., User Equipments (UEs)) and thus directly exchanging user data (e.g., voice or multimedia data) between the devices without passing through a network. ProSe communication may include UE-to-UE communication, peer-to-peer communication, etc. In addition, the ProSe communication scheme may be applied to Machine-to-Machine (M2M) communication, Machine Type Communication (MTC), etc. Therefore, ProSe is being considered as one solution to burden of an eNodeB due to data traffic that rapidly increases. By introducing ProSe, effects such as reduction in procedures of the eNodeB, decreases in power consumption of devices that participate in ProSe, increase in data transmission rate, increase in network accommodation capacity, load distribution, cell coverage expansion, etc. can be expected.

DISCLOSURE

Technical Problem

Although the need of the introduction of ProSe has been discussed as described above, a detailed solution for a mechanism for supporting and controlling ProSe has not been suggested.

Accordingly, an object of the present invention devised to solve the conventional problem is to provide an EPC-level ProSe discovery solution for acquiring position information from a user equipment (UE) in respect of a ProSe based communication mechanism.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention to solve the aforementioned problems, a method by which a first user equipment (UE) that is located out of the range of a group communication service determines a relay through a proximity service (ProSe) in a wireless communication system comprises the steps of receiving traffic transmitted by a second UE which already relays group communication; determining whether the traffic is information bound to group communication; determining a relay UE by using a discovery procedure for a relay for the group communication when the traffic is not recognized as the information bound to the group communication; and determining the second UE as the relay UE for the group communication when the traffic is recognized as the information bound to the group communication.

Moreover, whether the traffic is information bound to the group communication is determined for a predetermined period of time.

Moreover, the traffic includes at least one of information as to relay of the group communication, a relay UE type, information bound to the relay UE for the group communication, data bound to the group communication, and response information to a relay request. Preferably, the data bound to the group communication are configured such that at least one of a destination IP address, a destination layer-2 address and a layer-2 address is bound to the group communication, and when the data bound to the group communication are the same as those previously stored in the first user equipment, the traffic is recognized as the information bound to the group communication.

Moreover, the traffic is broadcasted through a direct communication channel for the ProSe.

Moreover, the method further comprises the step of configuring a relay relation or ProSe communication relation with the determined relay UE.

Moreover, the method further comprises the step of periodically requesting that a relay of the determined relay UE should be maintained.

Moreover, the method further comprises the step of responding to a signal periodically transmitted from the determined relay UE.

Moreover, the method further comprises the step of reselecting a relay UE when a signal is not received from the determined relay UE for a predetermined period of time.

In another aspect of the present invention to solve the aforementioned problems, a first user equipment (UE) that is located out of a group communication service coverage and determines a relay through a proximity service (ProSe) in a wireless communication system comprises a radio frequency (RF) unit; and a processor, wherein the processor is configured to receive traffic transmitted by a second UE which already relays group communication, determine whether the traffic is information bound to group communication, determine a relay UE by using a discovery procedure for a relay for the group communication when the traffic is not recognized as the information bound to the group communication, and determine the second UE as the relay UE for the group communication when the traffic is recognized as the information bound to the group communication.

Advantageous Effects

According to the present invention, time/frequency resources required to perform a discovery operation can be prevented from being wasted when a relay is performed, and the discovery operation and a data reception operation can be performed at the same time, whereby efficient communication can be performed.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless communication systems. Although the following description will be made based on the 3GPP LTE and 3GPP LTE-A system for clarification, it is to be understood that the technical spirits of the present invention are not limited to the 3GPP LTE and 3GPP LTE-A system.

Terminologies used herein will be defined as follows.

UMTS (Universal Mobile Telecommunications System): GSM (Global System for Mobile Communication) based third generation mobile communication technology developed by the 3GPP.

EPS (Evolved Packet System): Network system that includes an EPC (Evolved Packet Core) which is an IP based packet switched core network and an access network such as LTE and UTRAN. This system is the network of an evolved version of the UMTS.

NodeB: Base station of GERAN/UTRAN. This base station is installed outdoor and its coverage has a scale of a macro cell.

eNodeB: Base station of LTE. This base station is installed outdoor and its coverage has a scale of a macro cell.

UE (User Equipment): The UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The UE enables communication through 3GPP spectrum such as LTE and/or non-3GPP spectrum such as WiFi and spectrum for public safety.

Proximity Services or Proximity-based Services (ProSe): Service that enables discovery between physically proximate devices, and mutual direct communication/ communication through a base station/communication through the third party. At this time, user plane data are exchanged through a direct data path without through a 3GPP core network (for example, EPC). This service is also referred to as a device-to-device (D2D) device.

Proximity: Whether a UE is proximate to another UE is determined depending on whether a predetermined proximity reference is satisfied. Proximity reference may be given differently for ProSe discovery and ProSe communication. Also, proximity reference may be set to a control target of an operator.

ProSe Discovery: Procedure for identifying whether a UE is proximate to another UE by using E-UTRA.

ProSe Communication: Communication between proximate UEs, which is performed through a communication path established between UEs. The communication path may be formed directly between the UEs, or may be routed through a local base station (s) eNodeB.

ProSe-enabled UE: UE that supports ProSe discovery and/or ProSe communication. Hereinafter, this ProSe-enabled UE is referred to as UE.

ProSe-enabled Network: Network that supports ProSe discovery and/or ProSe communication. Hereinafter, this ProSe-enabled network is referred to as network.

ProSe Broadcast Communication: a one-to-all ProSe E-UTRA Communication, between all authorized Public Safety ProSe-enabled UEs in proximity, by means of a common ProSe E-UTRA Communication Path established between these UEs.

ProSe-assisted WLAN direct communication: ProSe Communication using a ProSe-assisted WLAN direct communication path. This ProSe-assisted WLAN direct communication may also be referred to as EPC-assisted WLAN direct communication.

ProSe Group Communication: one-to-many ProSe Communication between more than two ProSe-enabled UEs in proximity, by means of a common communication path established between the ProSe-enabled UEs.

ProSe Broadcast Communication: one-to-all ProSe Communication between more than two ProSe-enabled UEs in proximity, by means of a common communication path established between the ProSe-enabled UEs.

ProSe UE-to-Network Relay: is a form of relay in which a Public Safety ProSe-enabled UE acts as a ProSe E-UTRA Communication relay between a Public Safety ProSe-enabled UE and the ProSe-enabled network using E-UTRA.

ProSe UE-to-UE Relay: is a form of relay in which a Public Safety ProSe-enabled UE acts as a ProSe E-UTRA Communication relay between two other Public Safety ProSe-enabled UEs.

RAN (Radio Access Network): Unit that includes NodeB, eNodeB and RNC (Radio Network Controller) for controlling NodeB and eNodeB at a 3GPP network. RAN exists between the UE and the core network and provides connection to the core network.

HLR (Home Location Register)/HSS (Home Subscriber Server): Database having subscriber information within the 3GPP network. The HSS may perform functions such as configuration storage, identity management, and user status storage.

RANAP (RAN Application Part): Interface between RAN and a node (MME (Mobility Management Entity)/SGSN (Serving GPRS (General Packet Radio Service) Supporting Node)/MSC (Mobiles Switching Center)) for handling control of the core network.

PLMN (Public Land Mobile Network): Network intended to provide individuals with mobile communication services. This network may be configured for each operator.

NAS (Non-Access Stratum): Functional layer for transmitting and receiving signaling and traffic message between the UE and the core network at a UMTS protocol stack. Main functions of this layer support mobility of the UE, and support a session management procedure of establishing and maintaining IP connection between the UE and a packet data network gateway (PDN GW).

HNB (Home NodeB): CPE (Customer Premises Equipment) that provides UTRAN (UMTS Terrestrial Radio Access Network) coverage. More detailed matters may be understood with reference to standard document TS 25.467.

HeNodeB (Home eNodeB): CPE (Customer Premises Equipment) that provides E-UTRAN (Evolved-UTRAN) coverage. More detailed matters may be understood with reference to standard document TS 36.300.

CSG (Closed Subscriber Group): Subscriber group allowed to access one or more CSG cells within a PLMN (Public Land Mobile Network) as a member of CSG of H(e)NB.

LIPA (Local IP Access): IP capable UE accesses an entity having another IP function within the same residential/enterprise IP network through H(e)NB. LIPA traffic does not pass a mobile operator network. The 3GPP release-10 system provides access to resources on a local network (that is, network located in a house of a customer or a company) through H(e)NB.

SIPTO (Selected IP Traffic Offload): 3GPP release-10 system supports user traffic handover by allowing an operator to select a Packet data network GateWay (PGW) physically proximate to the UE at the EPC network.

PDN (Packet Data Network) connection: Logical connection between UE expressed as one IP address (one IPv4 address and/or one IPv6 prefix) and PDN expressed as APN (Access Point Name).

EPC (Evolved Packet Core)

Figure 1:
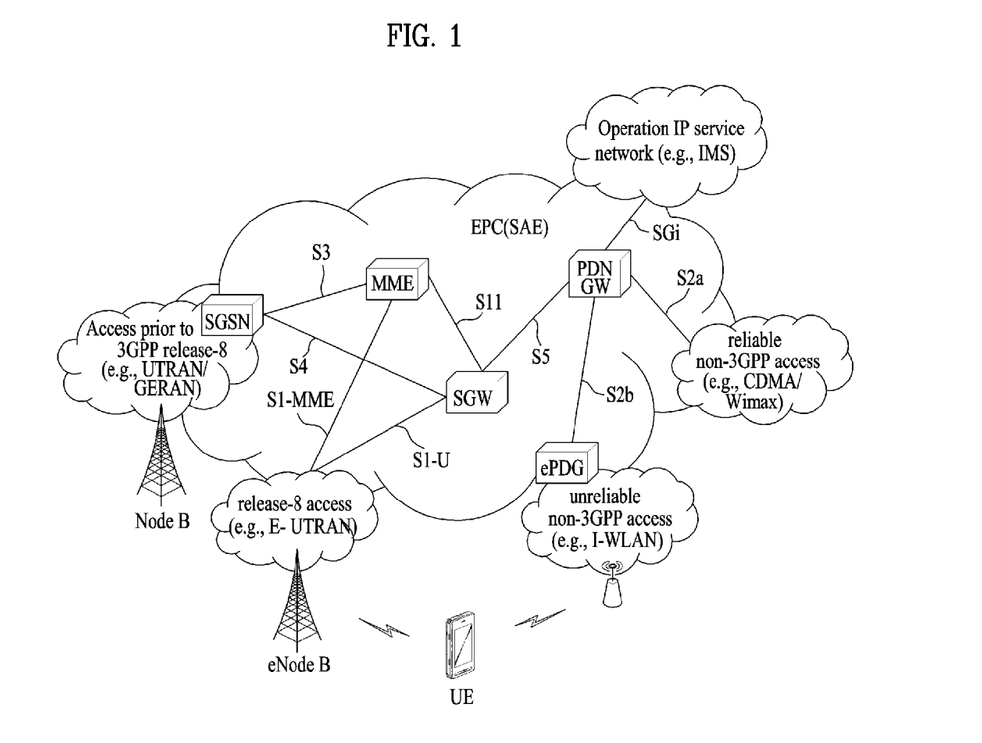
FIG. 1 is a diagram illustrating a brief structure of an Evolved Packet System (EPS) that includes an Evolved Packet Core (EPC)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |

TABLE 1-continued

| Reference Point | Description |
|---|---|
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing Proximity Service (ProSe)

The present invention proposes a control mechanism for supporting ProSe or a D2D service in a mobile communication system such as a 3GPP EPS.

Due to increase in user demands related to SNS, etc., demand for detection/discovery and special applications/services (e.g., proximity-based applications/services), between physically adjacent users/devices, has arisen. To provide such services even in a 3GPP mobile communication system, potential use cases and scenarios of the ProSe and potential service requirements are under discussion.

The potential use cases of the ProSe may include a commercial/social service, network offloading, public safety, and integration of current infrastructure services (to assure the consistency of user experience including reachability and mobility aspects). In addition, use cases and potential requirements for public safety in the case of absence of E-UTRAN coverage (in this case, limiting the use cases to specific frequency bands and specific terminals that are designated for public safety under the condition that specific regional regulation and operator policy are satisfied, should be considered) are under discussion.

In particular, the scope of discussion of the ProSe that is underway in 3GPP assumes that the proximity-based applications/services are provided via LTE or a WLAN and that discovery and communication are performed between devices under the control of an operator/network.

Figure 2:
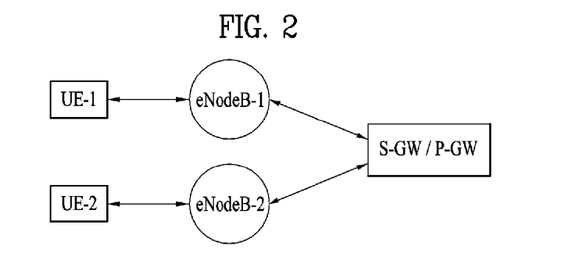
FIG. 2 is a diagram illustrating a default data path through which two user equipments UEs perform communication in an EPS.

FIG. 2 is a view illustrating a default data path for communication between two UEs in an EPS. That is, FIG. 2 illustrates an exemplary data path between UE-1 and UE-2 in a general case in which ProSe between UE-1 and UE-2 is not applied. This default path passes through a base station (e.g., an eNodeB or HeNodeB) and gateway nodes (e.g., an EPC or operator network). For example, as illustrated in FIG. 2, when UE-1 and UE-2 exchange data, data from UE-1 may be transmitted to UE-2 via eNodeB-1, an S-GW/P-GW, and eNodeB-2 and, likewise, data from UE-2 may be transmitted to UE-1 via eNodeB-2, an S-GW/P-GW, and eNodeB-1. Although UE-1 and UE-2 are camping on different eNodeBs in FIG. 2, UE-1 and UE-2 may camp on the same eNodeB. In addition, although the two UEs are served by the same S-GW and P-GW in FIG. 2, various combinations of services are allowed. For example, the UEs may be served by the same S-GW and different P-GWs, by different S-GWs and the same P-GW, or by different S-GWs and different P-GWs.

In the present invention, this default data path may be referred to as an infrastructure path, infrastructure data path, or infrastructure communication path. In addition, communication through the infrastructure data path may be referred to as infrastructure communication.

Figure 3:
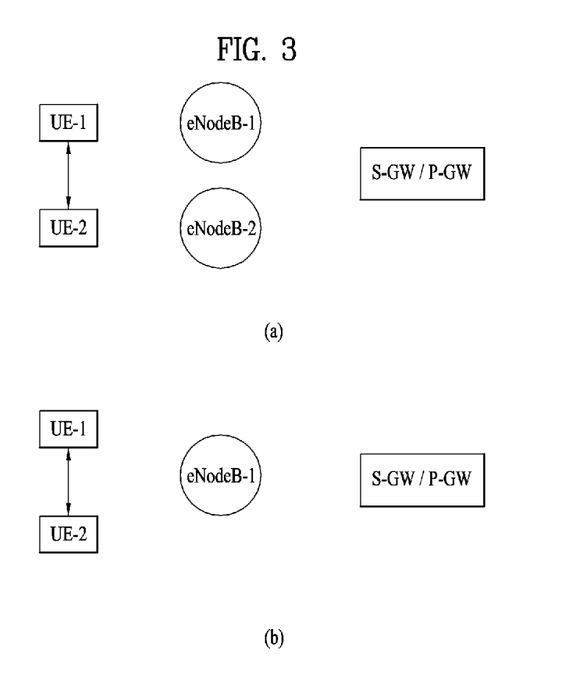
FIG. 3 is a diagram illustrating a direct mode data path between two UEs based on ProSe.

FIG. 3 is a view illustrating a direct mode data path between two UEs based on ProSe. This direct mode communication path does not pass via a base station (e.g., an eNodeB or HeNodeB) and gateway nodes (e.g., an EPC).

FIG. 3(a) illustrates an exemplary case in which UE-1 and UE-2 are camping on different eNodeBs (e.g., eNodeB-1 and eNodeB-2) and exchange data via a direct mode communication path. FIG. 3(b) illustrates an exemplary case in which UE-1 and UE-2 are camping on the same eNodeB (e.g., eNodeB-1) and exchange data via a direct mode communication path.

Meanwhile, it should be noted that a data path of a user plane is directly established between UEs without passing through an eNodeB or a gateway node as illustrated in FIG. 3 but a control plane path may be established via an eNodeB and a core network. Control information exchanged through the control plane path may be information about session management, authentication, authorization, security, billing, etc. In the case of ProSe communication between UEs served by different eNodeBs as illustrated in FIG. 3(a), control information for UE-1 may be exchanged via eNodeB-1 with a control node (e.g., an MME) of a core network and control information for UE-2 may be exchanged via eNodeB-2 with a control node (e.g., an MME) of a core network. In the case of ProSe communication between UEs served by the same eNodeB as illustrated in FIG. 3(b), control information for UE-1 and UE-2 may be exchanged via eNodeB-1 with a control node (e.g., an MME) of a core network.

Figure 4:
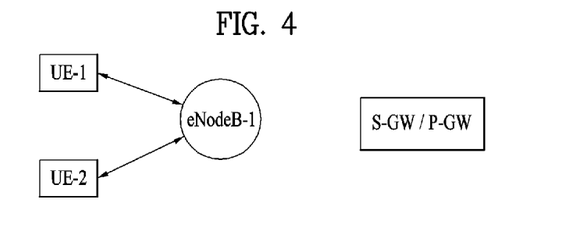
FIG. 4 is a diagram illustrating a locally-routed data path between two UEs based on ProSe.

FIG. 4 is a view illustrating a locally routed data path between two UEs based on ProSe. As illustrated in FIG. 4, a ProSe communication data path between UE-1 and UE-2 is established via eNodeB-1 but does not pass through a gateway node (e.g., an EPC) operated by an operator. For a control plane path, if a locally routed data path is established between UEs served by the same eNodeB as illustrated in FIG. 4, control information for UE-1 and UE-2 may be exchanged via eNodeB-1 with a control node (e.g., an MME) of a core network.

In the present invention, the communication path described above in relation to FIGS. 3 and 4 may be referred to as a direct data path, a data path for ProSe, a ProSe-based data path, or a ProSe communication path. In addition, communication through this direct data path may be referred to as direct communication, ProSe communication, or ProSe-based communication.

Figure 5:
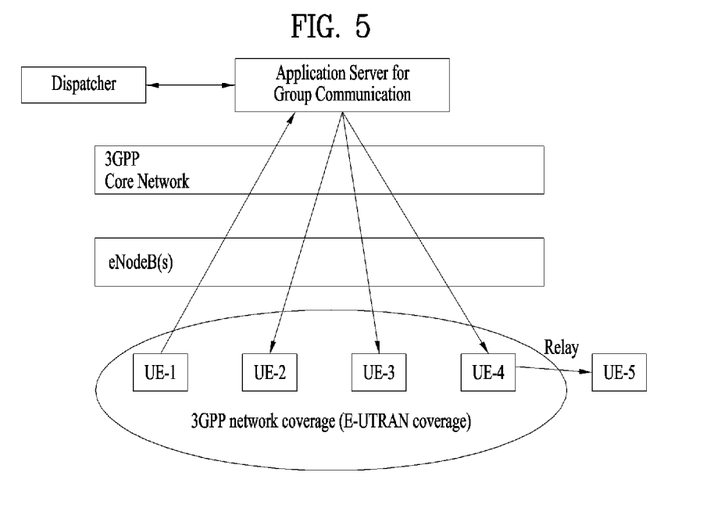
FIG. 5 is a diagram illustrating a group communication scenario that includes a UE-to-Network Relay operation.

FIG. 5 is a diagram illustrating a group communication scenario that includes a UE-to-Network Relay operation. As illustrated in FIG. 5, UE-1, UE-2, UE-3, UE-4, and UE-5 are member UEs/Users/Subscribers, which belong to the same group. Also, an application server (AP) that manages a group and group communication exists, and a dispatcher that manages a group exists. Group communication (or Group call) is similar to PTT (Push-To-Talk), and an operation for joining the group should be performed to join group communication. However, it is not to be understood that group communication is performed in the form of PTT only.

In group communication of FIG. 5, one UE may be a talking party, that is, a transmitter of media (e.g., voice, etc.) at one time. Therefore, a plurality of UEs cannot transmit media at the same time. In addition to UE that serves as a talking party that joins the group, which performs group communication, the other UEs receive media transmitted from the talking party UE. The role of the talking party UE may be performed if transmit permission is received from the AS or the dispatcher explicitly or implicitly.

Particularly, FIG. 5 shows that UE-5 receives group communication service through UE-4 without through a network. This case corresponds to a case where UE is out of 3GPP network coverage (hereinafter, E-UTRAN coverage) or inside E-UTRAN coverage that does not support group communication although the UE is inside E-UTRAN coverage. In this case, the UE may receive group communication service through a relay operation with a member UE which belongs to the same group served by group communication service through a network. Therefore, in the present invention, E-UTRAN coverage that supports group communication will be referred to as group communication service coverage. Moreover, for details related to group communication, refer to 3GPP TS 22.468 and 3GPP TR 22.803.

As described above, 'UE which is located out of group communication service coverage' or 'UE (that is, UE which desires a relay) which desires to receive group communication service through a relay is required to discover UE that may provide a relay, that is, UE-to-Network Relay UE, so as to receive group communication service.

For such a discovery operation, the UE which desires to receive a relay transmits a discovery request message through a discovery channel to discover the UE that may provide a relay.

Figure 6:
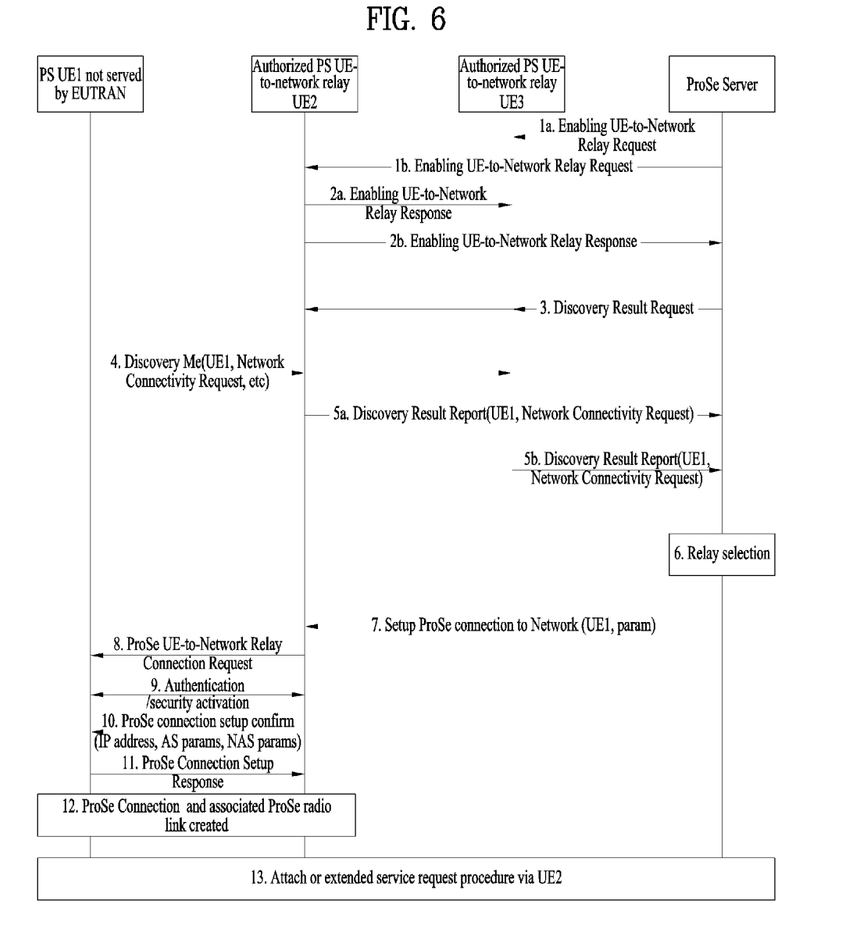
FIG. 6 is a diagram illustrating that a UE which is not served by an E-UTRAN receives a relay service from a UE-to-Network relay UE by triggering a relay selection procedure.

FIG. 6 is a reference diagram illustrating that a UE which is not served by an E-UTRAN triggers a relay selection procedure. A discovery request through the aforementioned discovery channel will be described with reference to FIG. 6.

In steps 1a) and 1b) of FIG. 6, a network (e.g., ProSe Server) authorizes to enable UE3 and UE2 to act as UE-to-Network relays.

In steps 2a) and 2b) of FIG. 6, the UE2 and the UE3 respond to authorization of the network (e.g., ProSe Server).

In step 3 of FIG. 6, the network (e.g., ProSe Server) may configure the UE2 and the UE3 to report discovery results (the step 3 of FIG. 6 is optional).

In step 4 of FIG. 6, once the UE1 needs network connectivity, it adds the request into an announced discovery message. That is, the request of network connectivity may be announced.

In steps 5a and 5b of FIG. 6, the UE1 and the UE2 and the UE3 that have received the request of network connectivity transmit the corresponding information to the network (e.g., ProSe server).

In step 6 of FIG. 6, the network (e.g., ProSe Server) makes a relay selection based on received information.

In step 7 of FIG. 6, the network transmits a setup request to the UE2 to setup a relayed connection for the UE1. In this case, parameters are included to setup radio link and ProSe connection between the UE1 and the UE2.

In step 8 of FIG. 6, the UE2 sends a request to setup ProSe communication to the UE1. In this case, the UE1 may be discovered by ProSe UE discovery step or may be identified with 3GPP level ProSe UE identifier which is already known (or previously configured).

In step 9 of FIG. 6, authentication and security activation is performed between the UEs (that is, UE1 an UE2 which perform ProSe communication).

In step 10 of FIG. 6, the UE2 sends a ProSe Connection Setup Confirm to the UE1. In this case, the ProSe Connection Setup Confirm may include IP address (of the UE2), global IP address for the UE1, and AS and NAS parameters to setup a ProSe communication and ProSe radio link using a secured radio link.

In step 11 of FIG. 6, the UE1 sends a ProSe Connection setup response message to the UE2. In this case, the ProSe Connection setup response message may include confirmed AS and NAS parameters.

In step 12 of FIG. 6, ProSe communication and associated ProSe radio link are completed.

In step 13 of FIG. 6, an attach or extended service request procedure via the UE2 is determined depending on whether the UE1 is registered in the network or not.

UE-to-Network Relay UE discovery through the discovery procedure such as step 4 of FIG. 6 requires time and radio resources to receive group communication service. In this respect, a method for providing group communication through a relay more quickly and resource-efficiently is suggested in the present invention.

UE-to-Network Relay for Proximity Service

The present invention suggests a mechanism that efficiently controls a relay function when proximity based services are provided in a mobile communication system such as 3GPP EPS (Evolved Packet System). The efficient relay function control mechanism suggested in the present invention may include combination of one or more operations of 1) an operation performed by a UE which desires to receive group communication services through a UE/relay which is located out of group communication service coverage and 2) operations performed by a UE which can relay group communication. Hereinafter, the operations 1) and 2) suggested in the present invention will be described in detail.

1. UE for Receiving UE-to-Network Relay

According to the present invention, a UE which is located out of group communication service coverage or a UE (hereinafter, referred to as relayed UE or UE-1) which desires to receive group communication services through a relay performs one or more operations of the followings 1-1) or 1-4) to receive group communication services.

1-1) The UE-1 checks whether message/signal including one or more of the following information/data/traffic has been received from another UE(s) and/or network for a certain period of time i) if there is no UE that serves as a relay for a group which desires to receive services (that is, if the UE-1 does not receive a relay with respect to the group) or ii) if the UE that serves as a relay should be discovered/determined/selected/reselected (this includes both a case where the UE-1 already receives a relay for the group and a case where the UE-1 does not receive a relay for the group). At this time, information related to the 'certain period of time' may be configured for the UE, or may be provided from the network. For reference, in the present invention, the group which desires to receive services may be construed as i) a group which desires to join services or ii) group communication which desires to receive services/desires to join services.

information that can relay communication for group(s) which desire(s) to receive services     information that indicates UE-to-Network relay or can provide connection to network     information on a UE that relays communication for group(s) which desire(s) to receive services. This may include group related application information as well as identification information on UE.

group communication data/traffic bound to group(s) which desire(s) to receive services. For example, if the group which desires to receive services is Group#1, audio traffic and video traffic may be used as data/traffic generated/transmitted for the Group#1. It may be recognized that the data/traffic is bound to the group(s) which desire(s) to receive services, based on destination IP address information and/or destination Layer-2 address information and/or destination Layer-2 ID information of the data/traffic. That is, the UE-1 may i) configure IP address information and/or Layer-2 address information and/or Layer-2 ID information bound to group(s) desired by the UE-1 to receive services or receive them from the network or another UE, and may ii) recognize that the data/traffic is bound to the group(s) desired by the UE-1 to receive services if destination IP address information and/or destination Layer-2 address information and/or destination Layer-2 ID information of the data/traffic are the same as IP address information and/or Layer-2 address information and/or Layer-2 ID information bound to group(s) desired by the UE-1 to receive services.

response information on message/signal (for example, "keep alive" or "refresh" message/signal) requesting/indicating to continue to perform a relay sent from the relayed UE.

Moreover, the aforementioned information may be received from a plurality of UEs. The UE-1 may listen/collect the above information for 'a certain period of time' periodically or in accordance with the need (for example, the need to select/reselect relay UE).

1-2) In the case that the UE-1 does not receive services through a relay UE with respect to a group desired by the UE-1 to receive services, as a result of the check of 1-1), the UE-1 performs the following operation 1-2-1) to 1-2-4). That is, as the result of the check 1-1), if the message/signal specified in the above 1-1) is not received, the UE-1 performs 1-2-1), and if not so, the UE-1 performs 1-2-2). Also, in the case that the UE-1 already receives services through a relay UE with respect to a group desired by the UE-1 to receive services, as a result of the check of 1-1), if the message/signal specified in the above 1-1) is not received, the UE-1 performs 1-2-3), and if not so, the UE-1 performs 1-2-4).

1-2-1) The UE-1 performs an operation for discovering a UE (hereinafter, referred to as relay UE or UE-2) that may serve as a relay with respect to a group desired by the UE-1 to receive services, that is, a UE that enables UE-to-Network relay. The UE-1 performs an operation for selecting/determining the relay UE. The discovery operation of the UE-1 includes an operation for transmitting message/signal to detect/discover UE-to-Network relay UE. The discovery may be direct discovery or EPC-level discovery. Also, the discovery may be targeted discovery or non-targeted discovery.

1-2-2) The UE-1 recognizes the relay UE based on the message received in the above 1-1). As a result, the UE-1 selects/determines the relay UE. The UE-1 may regard that the discovery operation for the relay UE is completed due to the reception of message/signal that includes information/data/traffic such as the above 1-1). The UE-1 may store information (for example, IP address, Layer-2 address, Layer-2 ID, etc.) on the relay UE on the basis of the received information/data traffic.

1-2-3) The UE-1 recognizes that the relay UE which provides a relay with respect to the group cannot serve as a relay any more. The reason why the relay UE cannot serve as a relay any more is that direct communication cannot be performed due to a long distance between the UE-1 and the relay UE. Therefore, the UE-1 performs an operation for discovering a UE that may serve as a relay with respect to the group desired by the UE-1 to receive services, that is, a UE that enables UE-to-Network relay (that is, relay UE or UE-2). In this case, an operation for selecting/determining the relay UE may be performed. The discovery operation of the UE-1 includes an operation for transmitting message/signal to detect/discover a UE-to-Network relay UE. The discovery may be direct discovery or EPC-level discovery. Also, the discovery may be targeted discovery or non-targeted discovery.

1-2-4) In the case that the UE-1 receives the message/signal specified in the above 1-1) transmitted from the relay UE (hereinafter, referred to as UE-3) that provides a relay with respect to the group, if the UE-1 determines that it cannot receive a relay from the UE-3 continuously (or if the UE-1 determines to select a new relay UE with respect to the group), the UE-1 performs an operation of 1-2-4-1). However, at this time, if the UE-1 determines that it can receive a relay from the UE-3 continuously, the UE-1 has only to continue to receive the relay from the UE-3. Also, in the case that the UE-1 does not receive the message/signal specified in the above 1-1) transmitted from the relay UE (that is, UE-3) that provides a relay with respect to the group, the UE-1 performs the following operation of 1-2-4-1) to select/determine a new relay UE with respect to the group.

1-2-4-1) In the case that the UE-1 receives the message/signal specified in the above 1-1), which indicates that a relay may be provided with respect to the group, from another UE(s) not the UE-3, the UE-1 selects/determines one of another UE(s) as a new relay UE (hereinafter, referred to as relay UE or UE-2). That is, the UE-1 may regard that the discovery operation for the relay UE is completed due to the reception of message/signal that includes information/data/traffic such as the above 1-1). The UE-1 may store information (for example, IP address, Layer-2 address, Layer-2 ID, etc.) on the relay UE on the basis of the received information/data traffic. In the case that the UE-1 does not receives the message/signal specified in the above 1), which indicates that a relay may be provided with respect to the group, from another UE(s) not the UE-3, the UE-1 performs an operation for discovering a UE, which may serve as a relay with respect to the group, that is, UE (that is, relay UE or UE-2) that enables UE-to-Network relay. In this case, an operation for selecting/determining the relay UE may be performed. The discovery operation of the UE-1 includes an operation for transmitting message/signal to detect/discover UE-to-Network relay UE. The discovery may be direct discovery or EPC-level discovery. Also, the discovery may be targeted discovery or non-targeted discovery.

1-3) After performing the operation (that is, 1-2-1), 1-2-2), 1-2-3) or 1-2-4-1)) for selecting a new relay UE, the UE-1 receives group communication services through a relay of the UE-2 (that is, relay UE that has selected or determined or recognized) with respect to the group desired by the UE-1 to receive services. To this end, the UE-1 may perform an operation for forming a relay relation with the UE-2 or an operation for forming a ProSe communication relation with the UE-2. This operation for forming a relay relation/ProSe communication relation may include at least one of i) group join/registration operation (group join/registration in application layer/level and/or group join/registration in 3GPP layer/system/level) and/or ii) an operation for forming a ProSe Communication path, iii) a request/response for initiation of a ProSe Communication path, iv) a request/response for initiation of Group Communication, v) a request/response for initiation of a ProSe relay, vi) a request/response for initiation of Group Communication service, vii) a request/response for initiation of Group service, viii) an operation for forming IP connection, ix) an operation for allocating IP address to a relayed UE, x) an authorization operation, and xi) group related security information exchange operation.

1-4) The relayed UE may perform the following operation 1-4-1) or 1-4-2).

1-4-1) The relayed UE-1 periodically transmits message/signal (for example, keep alive or refresh message/signal) requesting/indicating to continue to perform a relay to the UE that serves a relay. After receiving the message/signal, the UE (that is, relay UE) that serves a relay may transmit a response message/signal to the UE-1. The above 'period' information may be configured for the UE, or may be provided from the UE that serves a relay, or may be provided from the network. If the UE-1 transmits data/traffic with respect to the group (that is, group related data/traffic) or a response (for example, Ack) to data/traffic with respect to the group before the period expires/ends, the period may start again. For this reason, the message/signal requesting/indicating to continue to perform the relay may be replaced with the data/traffic with respect to the group (that is, group related data/traffic) or the response (for example, Ack) to data/traffic with respect to the group.

1-4-2) Unlike the above 1-4-1) that the UE-1 periodically transmits the message/signal to the UE that serves a relay, the UE that serves a relay may respond to the message/signal which is transmitted periodically.

Moreover, in the case that the UE-1 does not receive i) the message/signal transmitted from the UE that serves a relay, ii) the group related data/traffic, or iii) the response to the group related data/traffic for a certain period of time during the operation 1-4-1) or 1-4-2), the UE-1 may perform an operation for reselecting the relay UE. (The operation for reselecting the relay UE may depend on the description made in 1-2), 1-2-3) and 1-2-4), and this will be omitted for convenience of description.)

2. UE that Performs UE-to-Network Relay

According to the present invention, a UE (hereinafter, referred to as UE-2) that can relay group communication may perform one or more of the following operations 2-1) to 2-3). Hereinafter, it is assumed that the UE-2 may serve as UE-to-Network relay with respect to Group#1. However, this is only for convenience of description, and it will be apparent that the present invention may be applied to a case where the UE-2 serves as a UE-to-Network relay with respect to a plurality of groups.

2-1) In the case that the UE-2 receives a discovery request message/signal transmitted from another UE with respect to group(s) through which the UE-2 may serve as a relay, the UE-2 may transmit a response message to the discovery request message/signal. At this time, the response message may include one or more of information on group(s) through which the UE-2 may serve as a relay, information indicating that the UE-2 may serve as a relay, information indicating UE-to-Network relay, and information indicating that connection may be provided to the network.

2-2) The UE-2 may perform the following operation 2-2-1) and/or 2-2-2) by configuring a period.

2-2-1) After initiating that the UE-2 serves as a relay, the UE-2 periodically transmits/announces/broadcasts message/signal, which includes one or more of the followings, to another UE (UE-1). The 'period' information may be configured for the UE, or may be provided from the relayed UE, or may be provided from the network.

information on group(s) through which the UE-2 performs a relay operation for the UE-1 information indicating that the UE-2 may serve as a relay with respect to the group(s). This accompanies identification information of the UE-1. Also, this information may include application information related to a corresponding group.

information indicating UE-to-Network relay or information indicating connection may be provided to the network.

2-2-2) If communication for a group that serves as the relay is performed before the period expires/ends, that is, if the UE-2 transmits data/traffic with respect to the group (that is, group related data/traffic) or a response (for example, Ack) to data/traffic with respect to the group to allow relayed UE(s) to receive the data/traffic or the response to the data/traffic, the period may selectively start again. For this reason, the message/signal in the above 1-2-1) may be replaced with the data/traffic with respect to the group or the response to data/traffic with respect to the group. Also, the data/traffic with respect to the group (that is, group related data/traffic) or the response (for example, Ack) to data/traffic with respect to the group, which is transmitted from the UE-2, may be at least one of i) destination IP address information, ii) destination Layer-2 address information, iii) IP address information of destination Layer-2 ID information bound to group, iv) Layer-2 address information, and v) Layer-2 ID information, or may indicate at least one of them.

Moreover, in order to initiate that the UE-2 serves as a relay, to another UE (that is, UE-1), the UE-2 may perform an operation for forming a relay relation with the UE-1 or an operation for forming a ProSe communication relation in addition to the operation of the above operation 2-1). Since this operation is the operation 1-3), the corresponding operation will be replaced with the aforementioned description of the operation 1-3).

2-3) If the UE-2 that serves as a relay does not receive message/signal or group related data/traffic or a response to group related data/traffic from relayed UE(s) as described in the operation 1-4), the UE-2 quits the operation of 2-2-1). And, the UE-2 may not perform an operation for relaying group related data/traffic or a response message to group related data/traffic to another UE any more.

Although group communication including UE-to-Network relay operation has been described as above, the proximity based group communication method suggested in the present invention may be applied to group communication including UE-to-UE relay operation. Also, the present invention may be applied to a case where a plurality of UEs transmit media at the same time. Also, the present invention may be applied to one-to-one communication and broadcast communication including UE-to-Network relay operation and one-to-one communication and broadcast communication including UE-to-UE relay operation.

Moreover, the present invention may be applied to all of the UMTS/EPS mobile communication systems including 3GPP access network (for example, UTRAN/GERAN/E-UTRAN) and non-3GPP access network (for example, WLAN) without limitation to LTE/EPC network. Also, the present invention may be applied to all of the wireless communication system environments to which network control is applied.

Figure 7:
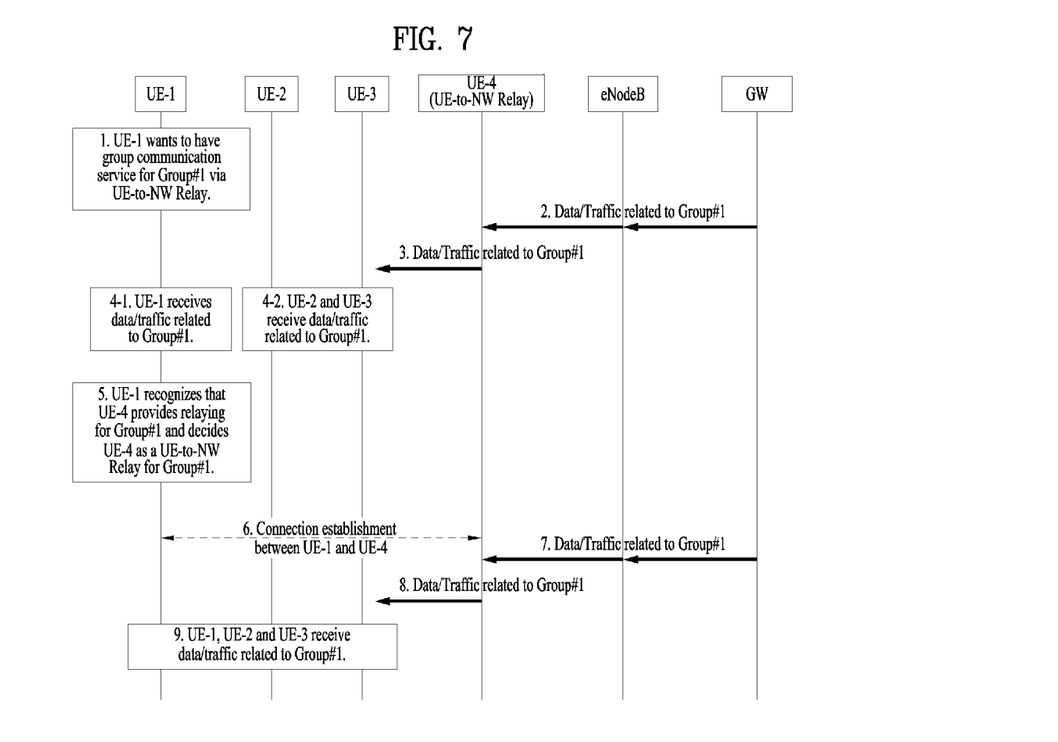
FIG. 7 is a diagram illustrating one embodiment of a method for providing a UE-to-Network relay service suggested in the present invention.

FIG. 7 is a diagram illustrating one embodiment of a method for providing a UE-to-Network relay service suggested in the present invention.

In step 1 of FIG. 7, a UE-1 is located out of group communication service coverage or is not served by an E-UTRAN. Therefore, the UE-1 may desire to receive group communication services for group #1 through a UE-to-Network Relay. However, in FIG. 7, it is assumed that a UE-2 and a UE-3 already receive group communication services for group #1 through a UE-4 which is a UE-to-Network relay.

In step 2 of FIG. 7, the UE-4 which is a UE-to-Network Relay receives data/traffic bound/related to group #1 from a network. A GW shown in FIG. 7 corresponds to a P-GW/S-GW when the data/traffic is transmitted in a unicast mode, and corresponds to an MBMS GW when the data/traffic is transmitted in an MBMS mode.

In step 3 of FIG. 7, the UE-4 that has received the data/traffic related to Group#1 from the network transmits the data/traffic in a direct communication mode to provide a relay for Group#1. At this time, the UE-4 configures at least one of i) destination IP address information of data/traffic, ii) destination Layer-2 address information, iii) IP address information of destination Layer-2 ID information bound to Group#1, iv) Layer-2 address information, and v) Layer-2 ID information, and transmits the information using a direct communication channel only once regardless of the number of relayed UEs (that is, broadcast mode in view of radio). Also, the UE-4 configures its IP address information and/or Layer-2 address information and/or Layer-2 ID information in source IP address information of the data/traffic and/or source Layer-2 address information and/or source Layer-2 ID information.

In step 4-1 of FIG. 7, the UE-1 receives the data/traffic for Group#1 transmitted from the UE-4.

In step 4-2 of FIG. 7, the UE-2 and the UE-3 also receive the data/traffic for Group#1 transmitted from the UE-4. In this case, although the order of the step 4-1 and the step 4-2 is intended for easiness of description, the step 4-2 may be prior to the step 4-1 or the steps 4-1 and 4-2 may be performed at the same time.

In step 5 of FIG. 7, the UE-1 recognizes that the UE-4 relays group communication for Group#1. In this respect, the UE-4 is determined as a UE-to-Network Relay for Group#1, and information (for example, IP address, Layer-2 address, Layer-2 ID, etc.) on the UE-4 is stored based on the information included in the received data/traffic. As a result, the UE-1 completes a discovery operation for a relay UE by receiving the data/traffic for the Group#1.

In step 6 of FIG. 7, optionally, the UE-1 may perform an operation for forming a relay relation with the UE-4 or an operation for forming a ProSe communication relation with the UE-4. Details of this operation will be understood with reference to the operation 1-3).

Since steps 7 and 8 of FIG. 7 may be performed equally to the steps 2 and 3 of FIG. 7, their description will be replaced with the description of the steps 2 and 3 of FIG. 7.

In step 9 of FIG. 7, the UE-1, the UE-2 and the UE-3 receive the data/traffic for the Group #1, which is transmitted from the UE-4.

Figure 8:
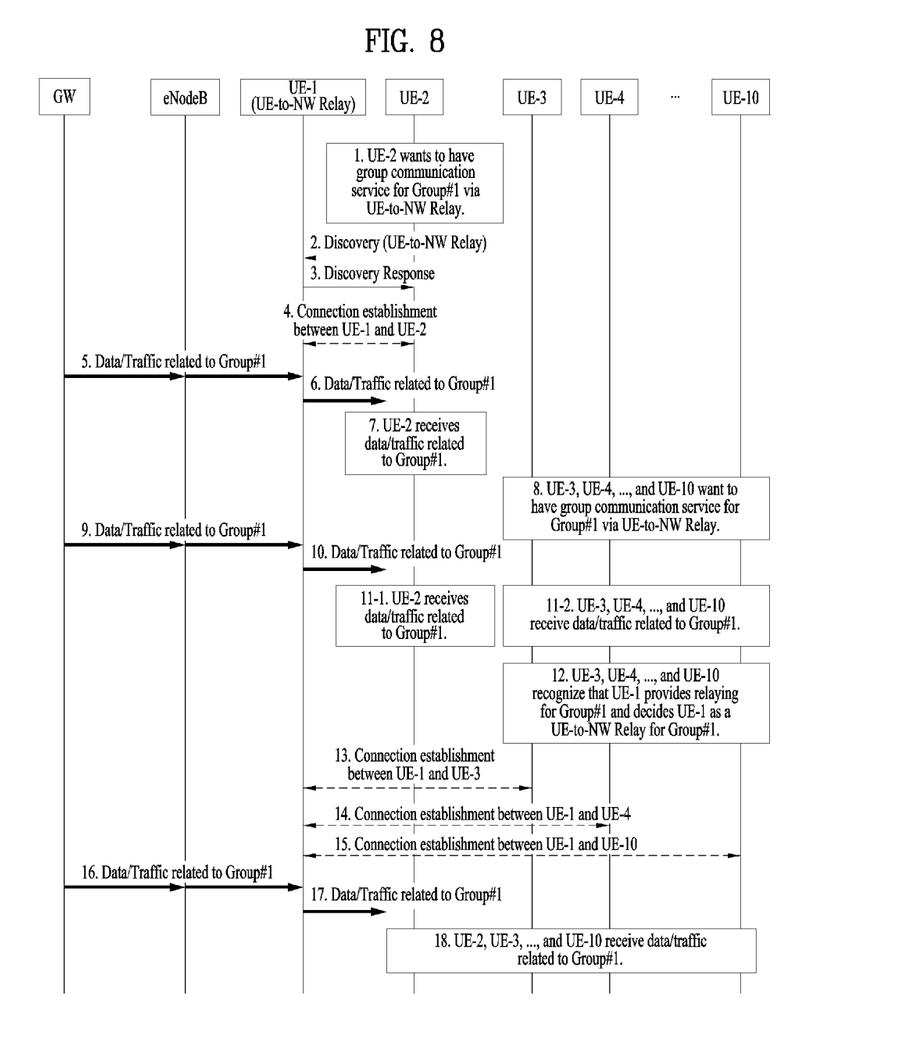
FIG. 8 is a diagram illustrating another embodiment of a method for providing a UE-to-Network relay service suggested in the present invention.

FIG. 8 is a diagram illustrating another embodiment of a method for providing a UE-to-Network relay service suggested in the present invention.

In FIG. 8, it is assumed that firemen which belong to Group#1 have rushed out to control a disaster situation (for example, fire) occurred outside group communication service coverage (or outside E-UTRAN coverage). UE-1 to UE-10 are those which all belong to Group#1. In this case, it is assumed that the UE-1 is inside group communication service coverage or is served by an E-UTRAN, whereas the other UEs (that is, UE-2, UE-3, . . . , UE-10) are located out of group communication service coverage or are not served by the E-UTRAN.

In step 1 of FIG. 8, since the UE-2 is located out of group communication service coverage or is not served by the E-UTRAN, the UE-2 desires to receive group communication services for group #1 through a UE-to-Network Relay. In this respect, the UE-2 checks whether the message/signal described in 1-1) regarding "1. UE for receiving UE-to-Network Relay" has been received from another UE(s) and/or network for a certain period of time.

In step 2 of FIG. 8, since the UE-2 has not received the message/signal described in 1-1) regarding "1. UE for receiving UE-to-Network Relay" as a result of the step 1 of FIG. 8, the UE-2 performs a discovery operation for discovering a UE-to-Network Relay.

In step 3 of FIG. 8, the UE-1 that may serve as a UE-to-Network Relay for Group#1 transmits a response message to the discovery message received in the step 2 of FIG. 8, that is, a discovery response message, to the UE-2.

In step 4 of FIG. 8, optionally, the UE-1 may perform an operation for forming a relay relation with the UE-2 or an operation for forming a ProSe communication relation with the UE-2. Details of this operation will be understood with reference to the operation 1-3) described regarding "1. UE for receiving UE-to-Network Relay".

In step 5 of FIG. 8, the UE-1 which is a UE-to-Network Relay receives data/traffic bound/related to Group #1 from a network. A GW shown in FIG. 8 corresponds to a P-GW/S-GW when the data/traffic is transmitted in a unicast mode, and corresponds to an MBMS GW when the data/traffic is transmitted in an MBMS mode.

In step 6 of FIG. 8, the UE-1 that has received the data/traffic related to Group#1 from the network transmits the data/traffic in a direct communication mode to provide a relay for Group#1. In case of transmission based on the direct communication mode of the data/traffic, the UE-1 configures at least one of i) destination IP address information of data/traffic, ii) destination Layer-2 address information, iii) IP address information of destination Layer-2 ID information bound to Group#1, iv) Layer-2 address information, and v) Layer-2 ID information, and transmits the information using a direct communication channel only once regardless of the number of relayed UEs (that is, broadcast mode in view of radio). Also, the UE-1 configures at least one of its IP address information, and/or Layer-2 address information and/or Layer-2 ID information in source IP address information of the data/traffic and/or source Layer-2 address information and/or source Layer-2 ID information.

In step 7 of FIG. 8, the UE-2 receives the data/traffic for Group#1 transmitted from the UE-1.

In step 8 of FIG. 8, since UE-3 to UE-10 are located out of group communication service coverage or are not served by the E-UTRAN, the UE-3 to the UE-10 desire to receive group communication services for Group #1 through a UE-to-Network Relay. Although FIG. 8 illustrates that the UE-3 to the UE-10 are initiated to receive group communication services for Group#1 through a UE-to-Network Relay at the same time, this is only for convenience of description. Actually, the UE-3 to the UE-10 may be initiated to receive group communication services for Group#1 through a UE-to-Network Relay at various times, and later operations may be performed individually at various times.

Since steps 9 and 10 of FIG. 8 may be performed equally to the steps 5 and 6 of FIG. 8, their description will be replaced with the description of the steps 5 and 6 of FIG. 8.

In step 11-1 of FIG. 8, the UE-2 receives the data/traffic for the Group #1, which is transmitted from the UE-1.

In step 11-2 of FIG. 8, the UE-3 to the UE-10 also receive the data/traffic for the Group #1, which is transmitted from the UE-1. For reference, although the step 11-1 and the step 11-2 of FIG. 8 are sequentially disclosed for convenience of description, the step 11-2 may be prior to the step 11-1 or the steps 11-1 and 11-2 of FIG. 8 may be performed at the same time.

In step 12 of FIG. 8, the UE-3 to the UE-10 recognize that the UE-1 relays group communication for Group#1. In this respect, the UE-1 is determined as a UE-to-Network Relay for Group#1, and information (for example, IP address, Layer-2 address, Layer-2 ID, etc.) on the UE-1 is stored based on the information included in the received data/traffic. As a result, the UE-3 to the UE-10 complete a discovery operation for a relay UE by receiving the data/traffic for the Group#1.

In steps 13 to 15 of FIG. 8, optionally, the UE-3 to the UE-10 may perform an operation for forming a relay relation with the UE-1 or an operation for forming a ProSe communication relation with the UE-1. Details of this operation will be understood with reference to the operation 1-3) described regarding "1. UE for receiving UE-to-Network Relay".

Since steps 16 and 17 of FIG. 8 are performed equally to the steps 5 and 6 of FIG. 8, their description will be replaced with the description of the steps 5 and 6 of FIG. 8.

In step 18 of FIG. 8, the UE-2 to the UE-10 receive the data/traffic for the Group #1, which is transmitted from the UE-1.

Figure 9:
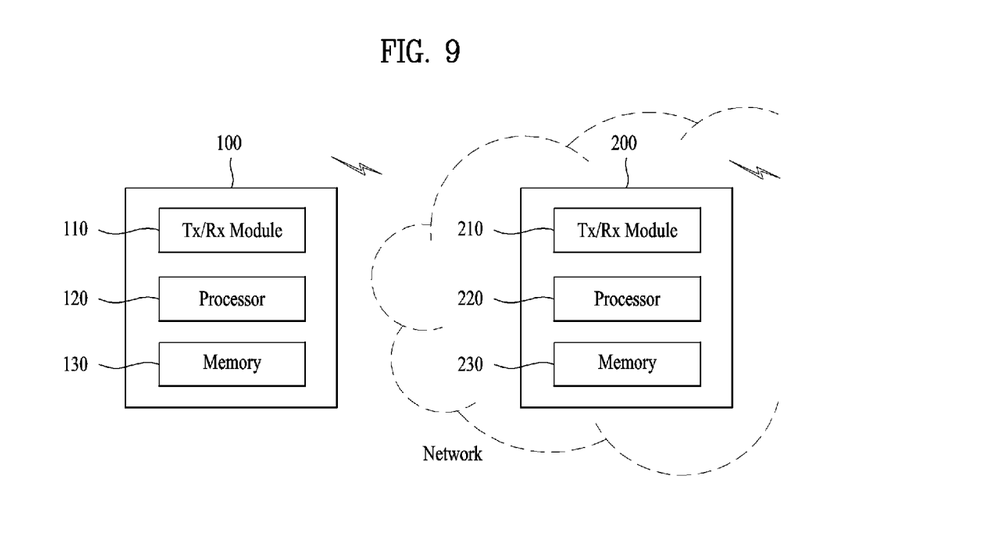
FIG. 9 is a diagram illustrating a preferred embodiment of a user equipment and a network node device according to one embodiment of the present invention.

FIG. 9 is a diagram illustrating a preferred embodiment of a user equipment and a network node device according to one embodiment of the present invention.

Referring to FIG. 9, the user equipment 100 according to the present invention may include a transceiving module 110, a processor 120, and a memory 130. The transceiving module 110 may be configured to transmit various signals, data and information to an external device and to receive various signals, data and information from the external device. The user equipment 100 may be connected with the external device through the wire and/or wireless. The processor 120 may control the overall operation of the user equipment 100, and may be configured to perform a function of operation-processing information to be transmitted to and received from the external device. The memory 130 may store the operation-processed information for a predetermined time, and may be replaced with a buffer (not shown).

The user equipment 100 according to one embodiment of the present invention may be configured to join ProSe in accordance with the result of a discovery for enabled ProSe initiated by a network or a discovery for a ProSe UE. The processor 120 of the user equipment 100 may be configured to transmit ProSe basic information to a network node device 200 by using the transceiving module 110. The processor 120 may be configured to receive information indicating whether ProSe is allowed, from the network node device 200 by using the transceiving module 110. The processor 120 may be configured to process signaling for performing direct data path setup with another user equipment. The processor 120 may be configured to perform direct communication with another user equipment by using the transceiving module 110. The processor 120 may be configured to transmit resultant information related to ProSe which is performed, to the network node device 200 by using the transceiving module 110.

Referring to FIG. 9, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. The memory 230 may store the operation-processed information for a predetermined time, and may be replaced with a buffer (not shown).

The network node device 200 according to one embodiment of the present invention may be configured to support ProSe between a plurality of user equipments. The processor 220 of the network node device 200 may be configured to receive ProSe basic information from the user equipment 100 or another network node device by using the transceiving module 210. The processor 220 may be configured to transmit information indicating whether ProSe is allowed, to the user equipment 100 by using the transceiving module 210. The processor 220 may be configured to process signaling for supporting the user equipment 100 to perform direct data path setup with another user equipment. The processor 220 may be configured to receive resultant information related to ProSe which is performed, from the user equipment 100 by using the transceiving module 210.

Also, the details of the aforementioned user equipment 100 and the aforementioned network node device 200 may be configured in such a manner that the aforementioned various embodiments of the present invention may independently be applied to the aforementioned user equipment 100 and the aforementioned network node device 200, or two or more embodiments may simultaneously be applied to the aforementioned user equipment 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

The invention claimed is:

1. A method by which a first user equipment (UE) that is located out of a range of a group communication service determines a relay UE through a proximity service (ProSe) in a wireless communication system, the method comprising:
   receiving, by the first UE, traffic transmitted by a second UE which already relays group communication;
   determining, by the first UE, whether the traffic is information bound to group communication;
   determining, by the first UE, a relay UE for the group communication by using a discovery procedure when the traffic is not recognized as the traffic that is bound to the group communication; and
   determining, by the first UE, the second UE as the relay UE for the group communication when the traffic is recognized as the traffic that is bound to the group communication.

2. The method according to claim 1, wherein whether the traffic is bound to the group communication is determined for a predetermined period of time.

3. The method according to claim 1, wherein the traffic includes at least one of information as to relay of the group communication, a relay UE type, information bound to the relay UE for the group communication, data bound to the group communication, and response information to a relay request.

4. The method according to claim 3, wherein the data bound to the group communication are configured such that at least one of a destination IP address, a destination layer-2 address and a layer-2 address is bound to the group communication, and when the data bound to the group communication are the same as those previously stored in the first user equipment, the traffic is recognized as the information bound to the group communication.

5. The method according to claim 1, wherein the traffic is broadcasted through a direct communication channel for the ProSe.

6. The method according to claim 1, further comprising the step of configuring a relay relation or ProSe communication relation with the determined relay UE.

7. The method according to claim 1, further comprising the step of periodically requesting that a relay of the determined relay UE should be maintained.

8. The method according to claim 1, further comprising the step of responding to a signal periodically transmitted from the determined relay UE.

9. The method according to claim 1, further comprising the step of reselecting a relay UE when a signal is not received from the determined relay UE for a predetermined period of time.

10. A first user equipment (UE) that is located out of a group communication service coverage and determines a relay UE through a proximity service (ProSe) in a wireless communication system, the first UE comprising:
a radio frequency (RF) unit; and
a processor operated with the RF unit,
wherein the processor is configured to:
receive traffic transmitted by a second UE which already relays group communication,
determine whether the traffic is information bound to group communication,
determine a relay UE for the group communication by using a discovery procedure when the traffic is not recognized as the traffic that is bound to the group communication, and
determine the second UE as the relay UE for the group communication when the traffic is recognized as the traffic that is bound to the group communication.

* * * * *